United States Patent [19]
Wagner

[11] 3,833,451
[45] Sept. 3, 1974

[54] A LAMINATED ELECTROCONDUCTIVE WINDOW
[75] Inventor: William E. Wagner, Verona, Pa.
[73] Assignee: PPG Industries, Inc., Pittsburgh, Pa.
[22] Filed: July 3, 1972
[21] Appl. No.: 268,381

[52] U.S. Cl. ............. 161/45, 29/611, 156/107, 174/68.5, 219/522, 336/192
[51] Int. Cl. ...... B32b 1/04, B32b 17/04, H05b 3/06
[58] Field of Search ......... 156/99, 107; 161/43, 44, 161/45; 174/68.5; 336/192; 219/522; 29/611

[56] References Cited
UNITED STATES PATENTS
2,650,976  9/1953  Gaiser et al. ............... 219/522

*Primary Examiner*—Philip Dier
*Attorney, Agent, or Firm*—Edward I. Mates

[57] ABSTRACT

A laminated, electrically heated window comprising accordion-folded bus bars making surface to surface contact with a transparent electroconductive film on a surface of a rigid transparent panel to insure intimate sliding contact between the bus bars and the film when the panel and the bus bars expand or contract at different rates as the temperature of the window changes during use.

A specific embodiment of the present invention suitable for an automobile windshield comprises a laminated, electroconductive window comprising one or two glass sheets, a layer of transparent, electroconductive coating on the inner surface of one or both of said glass sheets, a layer of plastic interlayer material, and a pair of accordion-folded bus bars extending along the opposite side edges of the interlayer material. Each bus bar has one surface bonded to a surface of said layer of transparent interlayer material that faces an electroconductive coating and the other surface of the folded bus bars is in sliding surface to surface contact with said coating. The folded bus bars flex in response to differences in expansion and contraction between the layer of interlayer material and the coated glass and maintain good electrical contact with the coating due to the surface to surface contact therebetween. Intimate surface to surface contact is obtained during lamination of the glass to the layer of plastic interlayer material.

13 Claims, 3 Drawing Figures

PATENTED SEP 3 1974　　　　　　　　　　　　　　　3,833,451

A LAMINATED ELECTROCONDUCTIVE WINDOW

BACKGROUND OF THE INVENTION

A. Field of the Invention

The present invention relates to laminated windows for vehicles having a transparent electroconductive coating on a surface of at least one of the transparent layers and a separate pair of accordion-folded bus bars that make surface to surface contact with each said coating so that when a potential difference is applied between the bus bars of a given pair of bus bars, an electric current flows through the coating to heat the window, which heat dissipates fog, mist and frost that may be deposited on the window.

In order to supply sufficient energy for the coating to heat the window sufficiently, it is necessary that there be good intimate contact between the electroconductive coating and the bus bars. In the past, it has been noted that stresses at the bonded interface between each bus bar and the coating, resulting from differences in thermal expansion between the coated panel and the bus bar or stresses resulting from the fabricating operation or in service, have caused many windows to function improperly and even to cause breakage. These malfunctions have been associated with poor distribution of electrical energy between the bus bars and the coating that results in regions of high local current density that disrupt the fragile coating. An electroconductive thermoplastic, flexible, metalo-organic tape has been proposed as an interfacial bond between the bus bars and the coating to accommodate for the previously described stresses that cause disruptions in the electroconductive coating.

It has been discovered that mismatched thermal expansion or contraction between the bus bar and the coated layer of the laminate influencing movement of the metallic coating continues to cause burnout problems despite the use of said flexible tape. Indeed, often burnout is experienced without prior visible disruption of the metallic coating. This is believed to occur because thin metallic films have a characteristic such that a localized tensile stress resulting from relative movement between the bus bar and the coated layer produces a commensurate increase in localized resistivity, which becomes a localized overheated region when it carries an electric current. Overheating, in turn, leads to burnout failure. Thus, need exists for bus bar assemblies more perfectly responsive to thermal expansion and contraction of laminated transparencies in which they are incorporated.

B. Description of the Prior Art

It has been proposed in U.S. Pat. No. 3,612,745 to Warren to remedy this problem somewhat by using accordion-pleated bus bars having one surface embedded in the interlayer material and superimposing an electroconductive metallo-thermoplastic tape over each bus bar to provide area contact between the pleated bus bar and the electroconductive coating on the surface of the rigid transparent panel that faces the interlayer. This proposed solution requires the application of a length of electroconductive metallo-thermoplastic tape between each bus bar and the electroconductive coating to be subjected to electrical energy. It is necessary that the tape be applied in alignment with each bus bar, particularly along the inboard edge of the bus bar. Such precise application of the conductive tape is time-consuming and expensive. Furthermore, if not applied exactly, the conductive tape may reduce the vision area of the laminated window if it is applied beyond the inboard edge of the bus bar or may cause poor bus bar to coating contact along the inboard edge of the bus bar if the tape does not extend to the inboard edge of the bus bar. Furthermore, while the tape is sufficiently flexible to take up some of the stress previously met due to thermal expansion differences, the tape does not eliminate the stress completely and some burn-out is still met during operation.

While the aforesaid patent to Warren is believed to be the most pertinent prior art, other patents relating to making connections between bus bars and electroconductive coatings used for heating purposes include U.S. Pat. No. 3,278,880 to Lewis et al., U.S. Pat. No. 3,344,316 to Stelmak, U.S. Pat. No. 3,524,920 to Stromquist et al., and U.S. Pat. No. 3,522,651 to Powell et al.

SUMMARY OF THE INVENTION

The present invention is based upon the discovery that it is possible to avoid the need for superimposing an electroconductive tape over each bus bar to adhere an accordion-foleded bus bar to a transparent electroconductive film in a laminated window and still obtain adequate uniformity of electrical contact. According to the present invention, a laminated window having a transparent electroconductive coating on a surface of a layer of rigid transparent material has its transparent electroconductive coating in slidable surface to surface contact with an accordion-folded bus bar bonded to a surface of a layer of transparent plastic interlayer material having a different coefficient of thermal expansion than that of the rigid transparent layer.

The layer of rigid transparent material is composed of any well known glazing material such as glass, polycarbonate, polyester resin and acrylic resin. The transparent electroconductive coating is composed of any durable material, such as a metal or metal oxide or mixtures thereof, preferably of the type produced by pyrolysis or cathode sputtering. The plastic material may be any well known material generally recognized as suitable for an interlayer for laminated glass such as a polyurethane resin, a polyvinyl acetal resin, and the like. The accordion-folded bus bars are preferably composed of metal or metal alloy and are supported along the length of opposite edge portions of the layer of the plastic interlayer material with one side of the folded bus bar embedded in the plastic interlayer material and the other side making surface to surface contact with the electroconductive coating.

The laminated window may be composed of either a single layer of rigid transparent material such as glass or an organic composition well known as a glass substitute, to which is bonded a layer of thermoplastic material conventionally used as an interlayer, or the laminated window may comprise two layers of rigid transparent material bonded to opposite sides of a layer of thermoplastic interlayer material. If desired, the surface of the second layer of rigid transparent material may also be provided with a transparent electroconductive coating and the layer of thermoplastic interlayer material may be provided on its major surface facing the second rigid sheet with an additional pair of bus bars aligned with the first pair of bus bars in position to make slidable surface to surface contact with the transparent electroconductive coating on the second layer of the rigid transparent material.

DESCRIPTION OF AN ILLUSTRATIVE EMBODIMENT

The present invention will be better understood in the light of a description of an illustrative embodiment thereof which follows. In the drawings which form part of the description and wherein like reference numbers refer to like structural elements:

DESCRIPTION OF THE PREFERRED EMBODIMENTS

Figure 1:
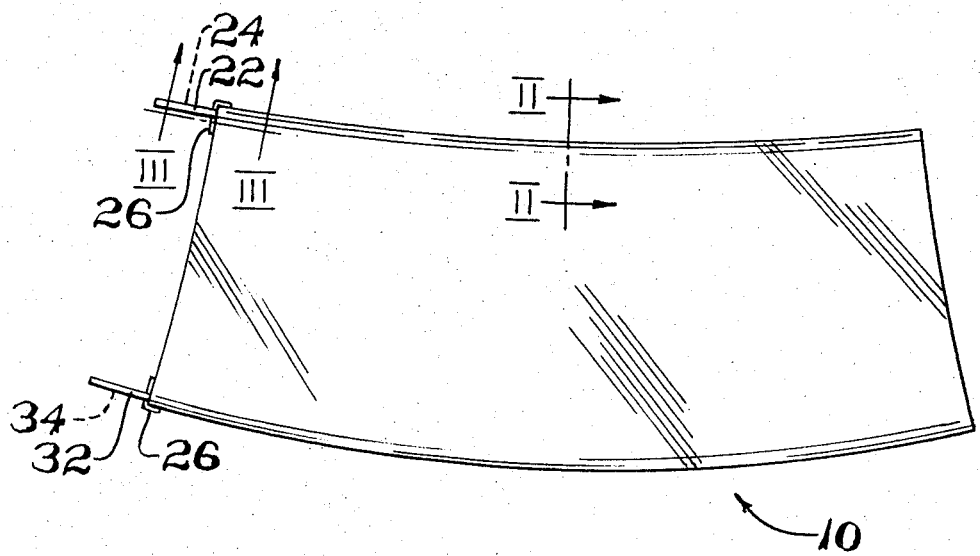
FIG. 1 is a frontal view of a typical laminated automotive windshield provided with a pair of transparent electroconductive coatings each in electrical contact with spaced accordion-folded bus bars according to the teachings of the present invention.
Figure 2:
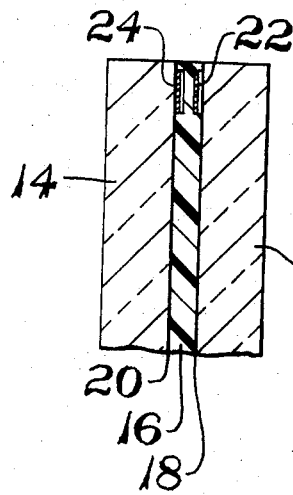
FIG. 2 is an enlarged, fragmentary, sectional view taken along the lines II—II of FIG. 1.
Figure 3:
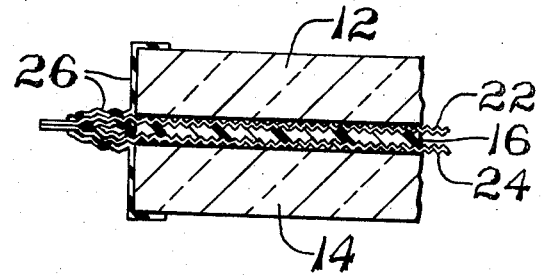
FIG. 3 is an enlarged, fragmentary, sectional view taken along the lines III—III of FIG. 1.

Referring to the drawings, a laminated electroconductive windshield 10 is shown comprising an outer glass layer 12, an inner glass layer 14, and a layer 16 of relatively flexible interlayer material such as a plasticized polyvinyl acetal resin or a polyurethane resin. The inward facing surface of the outer glass layer 12 is provided with a transparent electroconductive coating 18 and a similar coating 20 is on the inward facing surface of the inner glass layer 14. A bus bar 22 is bonded to one surface of the layer of interlayer material 16 along the top edge portion thereof. Another bus bar 24 is bonded to the opposite surface of the layer of interlayer material 16 in aligned relationship to the first bus bar 22 as shown in FIGS. 1 and 2. Along the opposite side edge of the layer of interlayer material 16 additional bus bars 32 and 34 are bonded to the opposite surfaces in aligned relationship to one another as seen clearly in FIG. 1. All the bus bars have their outer longitudinal side edges spaced approximately ½ to ¾ inch from the nearest edge of the windshield.

The bus bars 22, 24, 32, and 34 extend beyond one end edge of the windshield 10. In the vicinity of the edge portion of the windshield from which the bus bars extend, a silicone resin 26 is applied to exposed surfaces of each of the bus bars and to about one inch along the edge surface and corner of each of the layers of glass 12 and 14 extending away from the region from which each bus bar extends beyond the laminate. The silicone coating cures to provide a barrier for entry of oil and moisture between adjacent layers of the window in the vicinity of the periphery of the laminated window 10 where the bus bars extend beyond the edge of the window. Hence, the coating of silicone resin serves as edge sealing means for the window. A typical silicone resin suitable for this purpose is a silicone rubber that vulcanizes at room temperature and is marketed under the trademark of RTV Silicone by Dow Corning Corporation. Silicone resins having desired properties are well known and are described in various patents such as U.S. Pat. Nos. 3,077,465 to Bruner and 3,592,795 to Ashby.

Either or both the outer and inner glass layers 12 and 14 may be float glass, sheet glass or plate glass or any other well known transparent, rigid, transparent plastic material used in windows, such as polycarbonates, acrylic plastic and polyester resins of the types suggested in U.S. Pat. No. 3,009,845 to George L. Wiser.

The layer of relatively flexible interlayer material 16 may be composed of any well known interlayer material. One well known family of suitable materials are polyurethane resins derived by reacting an organic polyisocyanate with a material having a multiplicity of active hydrogen sites, for example, a polyether polyol and/or a polyester polyol. U.S. Pat. No. 3,509,015 to Marco Wismer et al. discloses suitable polyether polyols, while U.S. Pat. No. 2,871,218 to Charles S. Schollenberger discloses other preferred polyurethane compositions containing hydroxyl terminated polyesters. Other suitable polyurethane resins are described in "Polyurethanes Chemistry and Technology" by J. H. Saunders and K. C. Frisch, published by Interscience Publishers in 1964. Other interlayer materials having the required transparency, tensile strength and flexibility are polyvinyl acetals, particularly polyvinyl butyral as prepared according to U.S. Pat. No. 3,400,957 to Stamatoff. Polyvinyl acetals used in laminated safety glass usually contain a plasticizer. Many well known plasticizers suitable for use with polyvinyl butyral are disclosed in U.S. Pat. No. 2,526,728 to Burk et al. The most commonly used are monocarboxylic aliphatic — acid esters of ether glycols, such as triethylene glycol di-2 ethyl butyrate.

The transparent electroconductive coatings 18 and 20 are preferably composed of one or more metals or metal oxides or a mixture of one or more metals with one or more metal oxides. Transparent metal oxide coatings are described and claimed in U.S. Pat. No. 3,107,177 to Arnold E. Saunders and William E. Wagner. Such films are formed by reacting a metal compound such as an organo-tin compound contained in a film forming composition that is applied to a heated substrate below the temperature at which the substrate loses its shape and a temperature sufficiently high to react the film forming composition at the heated surface of the substrate to produce a metal oxide coating. Another suitable technique for forming suitable transparent electroconductive coatings on transparent glass or plastic substrates is by cathode sputtering such as depicted in U.S. Pat. No. 3,655,545 to Frank H. Gillery and Jean P. Pressau. Coatings of the types described hereinbefore are sufficiently durable to withstand sliding surface to surface contact with accordion-folded metal bus bars having different thermal expansion coefficients than the transparent electroconductive coating.

The bus bars may be made of any electrically conductive metal or metal alloy having requisite properties of ductility and electroconductivity and flexibility suitable for bus bar material. Suitable bus bar materials include copper, silver, gold, tin, aluminum, magnesium, iron, zinc, molybdenum, and various metal alloys such as copper-zinc, copper-magnesium copper-nickel, silver-gold, and the like. Since a preferred bus bar material combines low cost with an electrical resistivity as low as possible, copper foil is preferred.

In a particular embodiment of the present invention, copper bus bars ⅝ inch wide and 3 mils thick were accordion-folded every 1/32 inch of length in such a manner that the effective bus bar height from the tops of the peaks to the bottoms of the valleys was approximately 8 to 9 mils. A folded bus bar was applied along each longitudinal side edge of each opposite surface of a sheet of plasticized polyvinyl butyral which had previously been cut to an outline conforming to that of a preselected automobile windshield outline pattern. Localized heat was used to tack weld valleys of two bus bars to each of the opposite edge portions of each surface of the sheet of plasticized polyvinyl butyral at approximately every 1 to 2 inches of bus bar length to have each bus bar extend approximately parallel to the opposite edges of the plasticized sheet at a distance of approximately ½ inch inward of the adjacent edge. Several sheets so treated were stored. Other sheets of polyvinyl butyral were provided with a single pair of bus bars tack welded to the opposite edge portions of one surface only and stored. Still other sheets of polyvinyl butyral 12 inches square were provided with bus bars along a pair of opposite sides of either one surface or both surfaces in a similar manner and stored.

All the treated sheets were stored in a room maintained at controlled temperature of 70°F. and controlled relative humidity of 20 percent. In all cases, the bus bars were folded as described above before the tack welding step.

EXAMPLE 1

The following process was performed to produce several laminated windows, each comprising two glass sheets and an interlayer of polyvinyl butyral approximately 68 inches long and 27 inches wide. The glass sheets had a nominal thickness of 3/32 inch and the interlayer about 0.030 inch.

Each glass sheet was indivdually coated with a tin oxide film produced by heating each glass sheet for approximately 4 minutes in an enclosed furnace to raise the glass to a temperature of approximately 1,220° to 1,230°F. and immediately on removal from the furnace applying to the heated glass sheet a film forming composition consisting essentially of 5 gallons of dibutyl tin diacetate, 3 ⅔ gallons of triethylamine and 3 ½ gallons of 30 percent by weight of HF dissolved in methanol for sufficient time to produce a transparent electroconductive coating having a surface resistivity of 15 to 20 ohms per square.

The coated glass sheets were mounted in pairs on outline bending molds of the type depicted in U.S. Pat. No. 2,794,300 to James S. Golightly with diatomaceous earth parting material of the type described in U.S. Pat. No. 2,725,320 to Florian V. Atkeson et al. applied between the facing coated surfaces. The pairs were heated in a bending lehr of the type described in the aforesaid U.S. Pat. No. 2,794,300 to James S. Golightly until the heated glass sheets sag to conform to the upper shaping surface of the molds. The bent glass sheets were then cooled at a controlled rate to a temperature sufficiently low to permit handling. After bending, the surface resistivity of the coated bent glass sheet was increased to 25 to 30 ohms per square.

The bent glass sheets were separated and assembled on opposite sides of one of the stored sheets of plasticized polyvinyl butyral whose preparation was described previously. Each side of the polyvinyl butyral sheet had tack-welded thereto an accordion-folded bus bar of copper 3 mils thick and ⅝ inch wide folded every 1/32 inch along its length and provided with folds arranged in such a manner that the apparent thickness dimension of the folded bus bars was 8 to 9 mils. The bus bars extended beyond one edge of the assembly and silicone resin such as a silicone rubber that vulcanizes at room temperature and is available commercially under the trademark RTV silicone, sold by Dow Corning, was applied for about 1 inch along the edge surface of each glass sheet in the vicinity of the point of extension of each bus bar from the assembly and about 1 inch along the extension of the bus bars extending beyond the assembly.

Each assembly so formed was inserted in a laminating bag of polyurethane and polyethylene glycol terephthalate (Mylar), which bag was evacuated and sealed and the sealed bag with its contents subjected to a production autoclave cycle of 275°F. and a pressure of 300 pounds per square inch for 45 minutes. The bag was of the type described in U.S. Pat. No. 3,255,567 to Leroy D. Keslar and John S. Rankin. The accordion-folded bus bars were forced into intimate slidable surface to surface contact with the transparent electroconductive coatings during such autoclave cycle.

The light transmittance of the windshields so produced was 65 percent. The resistance from bus bar to bus bar of the parallel circuits was 7.5 ohms. No hot spots were formed in the corners of the windshield when power tested at 116 volts and 14 amperes current. Another power test involved heating one circuit only using 160 volts and 16 amperes with no hot spots.

Each windshield was stored over a cold box maintained at a temperature of −40°F. so that one surface of the windshield faced the cold box simulating a windshield facing an outside temperature of −40°F. The temperature facing the other major surface of the laminated windshield was +40°F. Ice forming on the windshield was removed within 4 to 6 minutes after power application was started. On application of one watt per square inch, the vision area in front of the driver and the passenger deiced first.

EXAMPLE 2

Several glass sheets precut to a pattern known as Fisher 1463 (about 68 inches by 27 inches) were coated with tin oxide coatings available commercially under the trademark of NESA and were laminated to opposite sides of a sheet of plasticized polyvinyl butyral 30 mils thick from a supply of sheets prepared as recited previously. The glass sheets were each of 3/32 inch nominal thickness. Two windshields were produced. One had a bus to bus resistance of 7.6 ohms, while the other had a bus to bus resistance of 8.0 ohms. Both had a transmittance to visible light of 65 percent. Both panels deiced within 4 minutes simulating an outside temperature of −40°F. and an inside temperature of +40°F.

EXAMPLE 3

Several 12 inch square sheets of glass 3/16 inch nominal thickness were laminated to opposite sides of plasticized polyvinyl butyral sheets provided with accordion-folded bus bars and stored as recited previously. One coated glass sheet having bus to bus resistance of 20 ohms was laminated to another coated glass sheet having bus to bus resistance of 25 ohms. The resulting laminated panel provided a parallel heating circuit having bus to bus resistance of 11 ohms. The light transmittance of the unit was 67 percent. Other units formed by laminating other stored sheets with glass sheets having tin oxide coatings of a surface resistivity of more than 40 ohms per square have light transmittance greater than 70 percent in the visible light band.

It is understood that the present invention is also suitable for use in fabricating a so-called heated bilayer windshield comprising an outer layer of glass or other rigid transparent material having a transparent electroconductive coating on its surface that faces a surface of a plastic layer provided with accordion-folded bus bars.

EXAMPLE 4

A preformed sheet of polyurethane plastic with folded bus bars applied along the opposite edges of one surface is assembled with said surface against the coated surface of a coated sheet of glass or other rigid transparent material and a second rigid sheet having a suitable parting material, preferably of an organo-silicone material that does not adhere to polyurethane, is assembled with said parting material in facing relation to the opposite surface of the preformed polyurethane sheet. The assembly so formed is inserted in a laminating bag of the type mentioned previously, the bag is evacuated and sealed, then the sealed bag and its contents subjected to the standard laminating procedure described previously. After commmpletion of the laminating procedure, the bag is opened, the contents removed and the rigid sheet with the parting material on its surface removed from the remainder of the assembly against which it was assembled. This results in a bilayer windshield having an electroconductive coating on the inner surface of the transparent rigid sheet and an interlayer of transparent plastic material having a pair of accordion-folded bus bars bonded on one side to the surface of the layer of plastic material facing the transparent electroconductive coating and the other side of the folded bus bars in pressurized surface to surface contact with the coating.

Several techniques are recited in U.S. Pat. No. 3,612,745 to Warren for imparting an accordion-fold to a bus bar. The use of knurling wheels having 32 teeth per inch has been found most suitable for producing suitable accordion-pleated copper bus bars by feeding a copper foil strip between opposing knurling wheels.

It is understood that during laminating, the folded bus bars are forced into slidable physical contact with the transparent electroconductive film or films. In use, automotive windshields may be exposed to temperatures varying from about −40°F. to more than 100°F. The inner surface of the windshield is exposed to the ambient conditions inside the auto, which are usually less severe. However, in use, the laminated windshield is subjected to changes in temperature. The plastic material of the inner layer or interlayer, depending upon the construction of the laminated window, has a much greater coefficient of thermal expansion than that of the rigid layer of transparent material, particularly when the latter layer is glass. However, accelerated test experiments have indicated that transparent electroconductive coatings of the type produced by cathode sputtering or high temperature chemical reaction such as pyrolysis, are capable of withstanding the sliding action of the folded bus bars of metal or metal alloy composition thereagainst and still provide deicing in approximately 4 minutes.

The present invention has indicated that it is unnecessary to provide an electroconductive thermoplastic tape or any other type of adhesive bond between the bus bar and the transparent electroconductive coating. It is much less expensive and time consuming to omit this step which the prior art considered important in the fabrication operation. The ability of the folded bus bars to change their flexure as they expand and contract enables them to slide relative to the electroconductive coating so as to maintain adequate electrical contact with the electroconductive coating to apply current across the coating without establishing hot spots of the type developed when the bus bars are adhered to the electroconductive coating. At the same time, the layer of plastic remains bonded to the coating and is sufficiently flexible to yield rather than cause the electroconductive coating to rupture due to the imposition of tension stress in the coating. Suitable electrical contact between each bus bar and the electroconductive coating is maintained throughout a long life simulated by accelerated testing when the bus bar is not bonded to the coating but is maintained in slidable surface to surface contact developed during the laminating operation.

Laminated windshields produced according to the present invention had a coefficient of transmission for visible light of at least 65 percent with a surface resistivity of as little as 8 ohms per unit square. The term "surface resistivity" is the resistance of any unit square of a deposited electroconductive coating measured from one edge to the opposite edge of the square. Thicker coatings have less surface resistivity but also lower transmission coefficients. At 110 volts potential difference between bus bars mounted as recited for Example 1, such units are capable of delivering about 0.9 watts per square inch.

The present disclosure represents a description of an illustrative preferred embodiment thereof. It is understood that various changes may be made without department from the spirit of the invention as defined in the claimed subject matter that follows.

I claim:

1. A laminated electroconductive article which comprises a window comprising a layer of rigid transparent material, a transparent, electroconductive coating on a surface of said layer of rigid transparent material, a layer of transparent interlayer material having a different coefficient of thermal expansion than that of said rigid transparent material bonded to said coated surface of said layer of rigid transparent material, and a pair of accordion-folded bus bars, each consisting essentially of a highly ductile, flexible, accordian-folded, highly electroconductive metal strip having one surface bonded to one surface of said layer of transparent interlayer material and extending adjacent a pair of opposite side edges of said window and having the other surface in slidable physical surface to surface contact with said coating.

2. A laminated electroconductive window as in claim 1, wherein said bus bars extend beyond an end edge portion of said window and edge sealing means is provided in the vicinity of said end edge portion.

3. A laminated window as in claim 1, wherein said transparent electroconductive coating contains tin oxide as an essential ingredient.

4. A laminated window as in claim 1, wherein said bus bars are composed of copper.

5. A laminated window as in claim 1, wherein said transparent rigid material is glass.

6. A laminated window as in claim 1, comprising a second layer of rigid transparent material bonded to said layer of interlayer material on the side opposite that occupied by said first layer of rigid transparent material and wherein a second transparent electroconductive coating is on the inner surface of said second layer of rigid transparent material, and another pair of accordion-folded bus bars, each consisting essentially of a highly ductile, flexible, accordion-folded, highly electroconductive metal strip, is connected on one surface to the other surface of said layer of transparent interlayer material facing said second coating in alignment with said first named pair of bus bars and having the other surface of said other pair of bus bars in slidable physical surface to surface contact with said second transparent electroconductive coating.

7. A laminated window as in claim 6, wherein at least one of said sheets of rigid transparent material is glass.

8. A laminated window as in claim 6, wherein both of said layers of rigid transparent material are composed of glass.

9. A laminated window as in claim 6, having a coefficient of visible light transmission of at least 65 percent and a surface resistivity of less than 10 ohms per square.

10. A laminated window as in claim 6, wherein said transparent electroconductive coating contains tin oxide as an essential ingredient.

11. A laminated window as in claim 6, wherein said bus bars are composed of copper.

12. A laminated window as in claim 1, wherein said bus bars are bonded at longitudinally spaced intervals to said interlayer material.

13. A laminated window as in claim 6, wherein said bus bars are bonded at longitudinally spaced intervals to said interlayer material.

* * * * *

UNITED STATES PATENT OFFICE
CERTIFICATE OF CORRECTION

Patent No. 3,833,451                         Dated September 3, 1974

Inventor(s) William E. Wagner

It is certified that error appears in the above-identified patent and that said Letters Patent are hereby corrected as shown below:

Title Page, Under "References Cited" please add:

| | | | |
|---|---|---|---|
| U.S. 2,145,930 | 2/1939  | Herron ......... | 156/99 XR |
| U.S. 2,730,598 | 1/1956  | Lytle .......... | 156/99 XR |
| U.S. 3,409,759 | 11/1968 | Boicey et al ... | 156/99 XR |
| U.S. 3,612,745 | 10/1971 | Warren ......... | 174/68.5  |

Column 1, line 30, "metalo" should be --metallo--

Column 2, line 25, "foleded" should be --folded--

Column 4, line 58, a comma should be inserted between "copper-magnesium" and "copper-nickel"

Column 7, line 25, please change "commpletion" to --completion--

Signed and sealed this 31st day of December 1974.

(SEAL)
Attest:

McCOY M. GIBSON JR.                C. MARSHALL DANN
Attesting Officer                  Commissioner of Patents